US012689797B2

(12) United States Patent
 Chandrashekar et al.

(10) Patent No.: US 12,689,797 B2
(45) Date of Patent: **\*Jul. 21, 2026**

(54) METHODS AND SYSTEMS FOR GENERATING A PLAYLIST OF CONTENT ITEMS AND CONTENT ITEM SEGMENTS

(71) Applicant: Adeia Guides Inc., San Jose, CA (US)

(72) Inventors: Padmassri Chandrashekar, Bangalore (IN); Daina Emmanuel, Bangalore (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/671,141

(22) Filed: May 22, 2024

(65) Prior Publication Data

US 2025/0373892 A1     Dec. 4, 2025

Related U.S. Application Data

(63) Continuation of application No. 17/362,518, filed on Jun. 29, 2021, now Pat. No. 12,022,153.

(51) Int. Cl.
| | |
|---|---|
| *H04N 21/442* | (2011.01) |
| *H04N 21/45* | (2011.01) |
| *H04N 21/482* | (2011.01) |
| *H04N 21/845* | (2011.01) |

(52) U.S. Cl.
CPC . *H04N 21/44204* (2013.01); *H04N 21/44213* (2013.01); *H04N 21/4532* (2013.01); *H04N 21/4825* (2013.01); *H04N 21/8456* (2013.01)

(58) Field of Classification Search
CPC ....... H04N 21/44204; H04N 21/44213; H04N 21/4532; H04N 21/4825; H04N 21/8456
See application file for complete search history.

(56) References Cited

U.S. PATENT DOCUMENTS

| | | | |
|---|---|---|---|
| 12,022,153 | B2 | 6/2024 | Chandrashekar et al. |
| 2007/0006262 | A1 | 1/2007 | Cleron et al. |
| 2011/0276155 | A1 | 11/2011 | Lindahl |
| 2014/0149555 | A1 | 5/2014 | Bank et al. |
| 2014/0321831 | A1 | 10/2014 | Olsen et al. |
| 2015/0143394 | A1 | 5/2015 | Hijikata et al. |
| 2015/0235672 | A1 | 8/2015 | Cudak et al. |
| 2015/0293928 | A1 | 10/2015 | Chen et al. |
| 2018/0227609 | A1 | 8/2018 | Hwang et al. |
| 2018/0268054 | A1 | 9/2018 | Mustain et al. |
| 2018/0367861 | A1 | 12/2018 | Sanghavi et al. |
| 2020/0169787 | A1 | 5/2020 | Pearce et al. |
| 2021/0321168 | A1 | 10/2021 | Ganuthula |
| 2022/0217433 | A1 | 7/2022 | Krugly et al. |
| 2022/0417594 | A1 | 12/2022 | Chandrashekar et al. |

*Primary Examiner* — Anthony Bantamoi
(74) *Attorney, Agent, or Firm* — HG LAW LLP

(57) ABSTRACT

Provided are systems and methods for providing content identified in a playlist associated with a profile. A content consumption system monitors a profile and determines a segment of a content item that is of interest to the profile. The segment of the content item is added to a playlist, which can then be looped.

20 Claims, 5 Drawing Sheets

Viewing Habits 1

Viewing Habits 2

1000

1100

METHODS AND SYSTEMS FOR GENERATING A PLAYLIST OF CONTENT ITEMS AND CONTENT ITEM SEGMENTS

CROSS-REFERENCE TO RELATED APPLICATIONS

This application is a continuation of U.S. patent application Ser. No. 17/362,518, filed Jun. 29, 2021, the disclosure of which is hereby incorporated by reference herein in its entirety.

BACKGROUND

The present disclosure is directed to providing content of interest to a user. More particularly, the present disclosure is directed to generating playlists of content items and/or content items segments.

SUMMARY

Users have favorite content item segments that they commonly want to repeat. They may want to repeat these same content item segments multiple times in a row. A user may want to loop their favorite content item segments in a playlist. It would be more convenient for a user to have a system that automatically determines these favorite content item segments for a user and compiles them into a playlist.

This disclosure describes systems and methods that automatically determine the content item segments that a user may choose to repeat and automatically compile them into a playlist. The system can then loop these content item segments. For example, a user may prefer certain content item segments of a show or movie, e.g., scenes or plotlines, more than others. For example, a user may prefer a content item segment of a song, e.g., an intro, verse, or chorus. The systems and methods disclosed are implemented as a content consumption system that can determine the content item segments that are of interest to a user. The content consumption system adds the content item segments to a playlist.

The content consumption system determines content item segments that are of interest to a user by monitoring the content consumption habits of the user. In some embodiments, the content consumption system can determine a content item segment to be of interest to a user if the user repeats the content item segment more than a threshold number of times. In some embodiments, the content consumption system can determine a content item segment to be of interest to a user if the content item segment is determined to be of interest to another user associated with the user.

The content consumption system adds content items and content item segments determined to be of interest to a user to a playlist. This playlist may contain one or more content item segments or one or more content items. In some embodiments, the playlist may consist of multiple content items of different media types. For example, a playlist may consist of a scene from a show in a GIF format and a content item segment of a song in an MP3 format. In some embodiments, the content consumption system may add data indicative of the content item segment to a playlist. For example, the content consumption system may add timing information of the content item segment, such as when the content item segment begins in the content item and its duration. The content consumption system can loop this playlist so that the same content item segments can be repeated. In some embodiments, the content consumption system can add content item segments similar to content item segments that are of interest to the user to the playlist. In some embodiments, the content consumption system may add content item segments of other content items similar to the content item segments that are of interest to the user to the playlist. In some embodiments, the content consumption system may add recommendations of other content items or content item segments, e.g., trailers or ads, to the playlist. In some embodiments, the content consumption system may determine that the audio component of a content item is of interest, while the video component is not of interest. In some embodiments, the content consumption system may determine that the content item is restricted from access for the user profile and block it from being added to the playlist. In some embodiments, the content consumption system may determine that the content item segment is not restricted from access for the user profile, even if other segments of the content item are, and allow it to be added.

BRIEF DESCRIPTION OF THE DRAWINGS

The above and other objects and advantages of the present disclosure will be apparent upon consideration of the following detailed description, taken in conjunction with the 12 accompanying drawings, in which like reference characters refer to like parts throughout, and in which.

DETAILED DESCRIPTION

A content item includes any suitable content that can be consumed by a user. For example, a content item can include video, audio, text, graphics, any other suitable form of content, or any combination thereof. Illustrative content items could be a movie, a television program series, an episode of a television program, a song, a music album, an audio book, a podcast or any other suitable content item. A content item segment is any suitable portion of a content item, delineated from the remainder of the content item in any suitable way. In some embodiments, a content item segment may be a scene (or portion of a scene) of a movie or of a television program, an episode of a multi-episode show, content corresponding to a plot are within a movie or television program (or any portion thereof), any other suitable portion of a content item, an audio track (or a portion thereof, such as a chorus portion of a song), any suitable audio portion of a movie or television program, and/or any combination thereof. A playlist is a list of identifiers of content items, content item segments, or both. A playlist can be generated and then stored or can be generated dynamically when needed.

Figure 1:
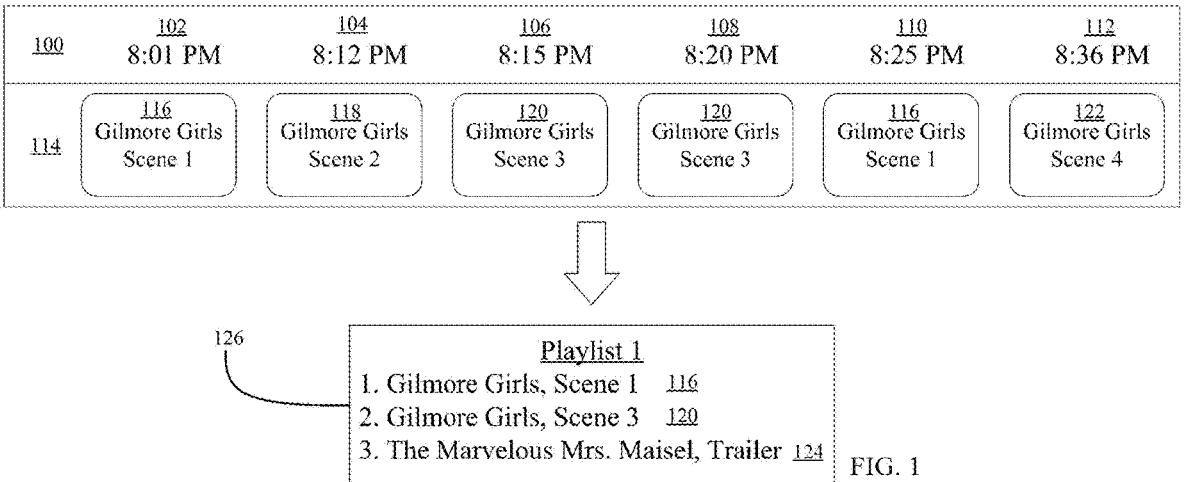
FIG. 1 shows an illustrative example for generating a playlist from the viewing habits of a user, in accordance with some embodiments of the disclosure.

FIG. 1 shows an illustrative example for generating a playlist of content item segments from the viewing habits of a user, in accordance with some embodiments of the disclosure. As the user consumes content item segments 114, e.g. as shown by the scenes of "Gilmore Girls," a content consumption system keeps track of respective times 100. The content consumption system is any hardware, software, or both that provides the features of the present disclosure. As more fully discussed with respect to FIGS. 10 and 11, the content consumption system can be implemented in any suitable one or more components located local to a user, remote from the user, or both. The content consumption system analyzes these consumption habits and determines that the user is interested in certain content item segments of the content item. In some embodiments, the content consumption system may determine that a content item segment is of interest to a user because the user has watched that content item segment more than a threshold number of times. For example, the content consumption system recognizes that segments 116 and 120 have each been repeatedly viewed within a short period of time. Segment 116 was viewed at times 102 and 110. Segment 120 was viewed at times 106 and 108. Segments 118 and 122 were each only viewed once, at times 104 and 112 respectively. This, in effect, is interpreted by the content consumption system as the user having an interest in looping the particular segments 116 and 120. In some embodiments, the content consumption system may determine that the user is repeating a scene to listen just the audio portion of a content item segment containing both audio and video streams. In some suitable approaches, the content item segment of interest may consist mainly of a song, in which case the song is recommended to the user (e.g., analytics collected from the Prime Video service can lead to recommendation on the Amazon Music apps). If the song is already part of a user playlist, then it can be given a higher priority when the playlist is placed in shuffle mode or that song can be used to identify and recommend related songs. In some suitable approaches, the content consumption system may determine that the user is interested in the audio portion of the content item, rather than the video portion, because the user indicates disinterest in the video portion. For example, the user may dim the screen, walk away from the screen but continue to listen via headphones, turn up the sound, make any other suitable indication of disinterest in the video portion, or any combination thereof.

As the user consumes content items, the content consumption system generates a playlist 126 including the segments 116 and 120. If the user finds segments 116 and 120 (e.g. scenes 1 and 3 of "Gilmore Girls") interesting enough to repeat, the content consumption system looks for corresponding similar content items and content item segments including, in some embodiments, trailers, any other suitable content item segment, and/or any combination thereof. In some embodiments, the content consumption system determines that the content items or content item segments are similar because they have the same actors, directors, writers, locations, music, genre, any other suitable description of media, and/or any combination thereof. In some suitable approaches, these similarities can be determined by comparing the metadata of content items. For example, in FIG. 1, the content consumption system determines that "The Marvelous Mrs. Maisel" is similar to "Gilmore Girls" because they are both written by Amy Sherman Palladino. Therefore, the content consumption system adds trailer 124 for "The Marvelous Mrs. Maisel" to the playlist. The content consumption system can then loop this playlist of content item segments for the user so that they can view only the content item segments that are of interest.

Figure 2:
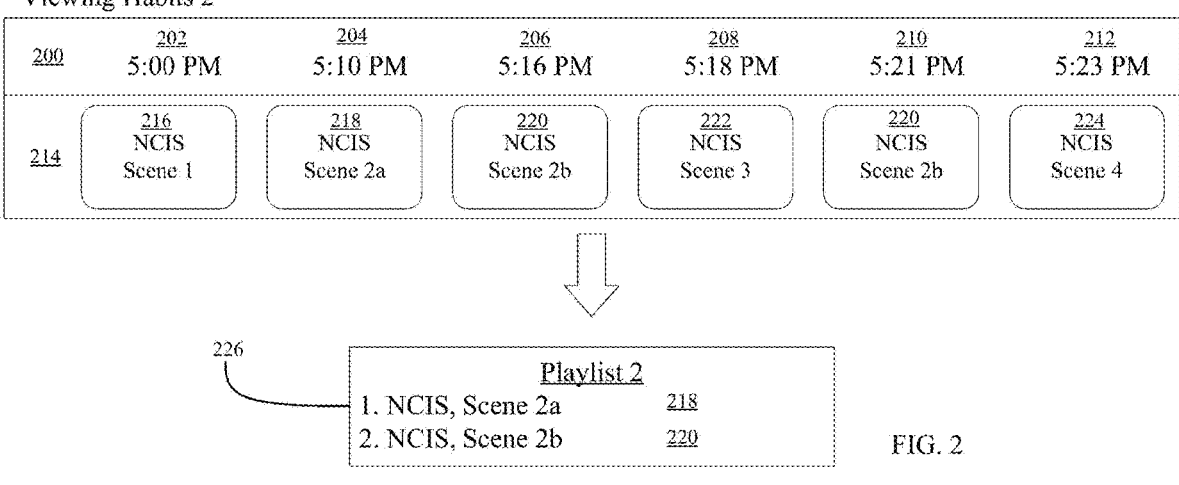
FIG. 2 shows another illustrative example for generating a playlist from the viewing habits of a user, in accordance with some embodiments of the disclosure.

FIG. 2 shows another illustrative example for generating a playlist from the viewing habits of a user, in accordance with some embodiments of the disclosure. As the user consumes segments 214, e.g. as shown by the scenes of "NCIS", the content consumption system keeps track of respective times 200. The content consumption system analyzes these viewing habits and determines that the user is interested in content item segments of the content item. The content consumption system recognizes that segment 220 has been repeatedly viewed within a short period of time at times 206 and 210. Segments 216, 218, 222, and 224 were each only viewed once, at times 202, 204, 208, and 212 respectively. This, in effect, is interpreted by the content consumption system as the user having an interest in looping the particular segment 220. As the user consumes content items, the content consumption system generates a playlist 226 including the segment 220. If the user finds segment 220 (e.g. scene 2b of "NCIS") interesting enough to repeat, the content consumption system looks for corresponding similar content items and content item segments including, in some embodiments, related scenes, any other suitable content item segments, and/or any combination thereof. The content consumption system may determine that content item segments are similar because they share the same plotlines, characters, any other suitable description of media, and/or any combination thereof. In some suitable approaches, these similarities can be determined by comparing the metadata of content items or content item segments. For example, the content consumption system adds segment 218 to the playlist 226 after determining that segment 218 is related to segment 220, e.g. scene 2a of "NCIS" is related to scene 2b of "NCIS". In some suitable approaches, metadata associated with content item segments can be determined using existing automatic content recognition (ACR) technologies, acoustic fingerprinting, machine-learning algorithms for feature extraction, any other suitable metadata extraction techniques, and/or any combination thereof. For example, available metadata about a segment that was replayed or favorited might include a "court scene" of genre "drama/crime" or a topic related to "World War II", or a figure (e.g., historical figure), and then similar segments can be identified and recommended. In some suitable approaches, the metadata of a content item or content item segment can include metadata about different content item segments of the content item, such as trivia, bonus content, other suitable additional content item segments, and/or any combination thereof. In some suitable approaches, the additional content item segment is related to another content item segment of the content item that was previously viewed or is upcoming. For example, the identified related segment can be used to generate a teaser or trailer for an upcoming episode in a TV series. The trailer can be used to entice the user to purchase the episode, or can be simply used as a preview of what's ahead in the content item.

Figure 3:
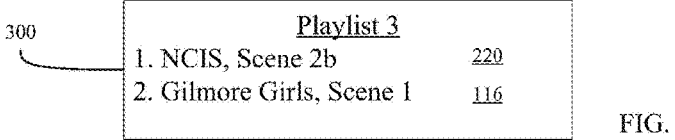
FIG. 3 shows an illustrative example for generating a playlist from the viewing habits of the associated users, in accordance with some embodiments of the disclosure.

FIG. 3 shows an illustrative example of a playlist with viewing habits of multiple users, in accordance with some embodiments of the disclosure. The content consumption system can include a portion or all of the playlist of one user in the playlist for another user. The playlist 300 includes segment 116 from playlist 126 in FIG. 1 and segment 220 from playlist 226 in FIG. 2. In some embodiments, the content consumption system may choose to combine play-lists of different users if it determines that the first user from the user viewing habits of FIG. 1 is associated with the second user from the user viewing habits of FIG. 2. In some embodiments, the users may be in the same family, be friends, any other suitable relationship, and/or any combination thereof. In some embodiments, the users may share an interest in similar content items.

Figures 4, 5, 6, 7, 8:
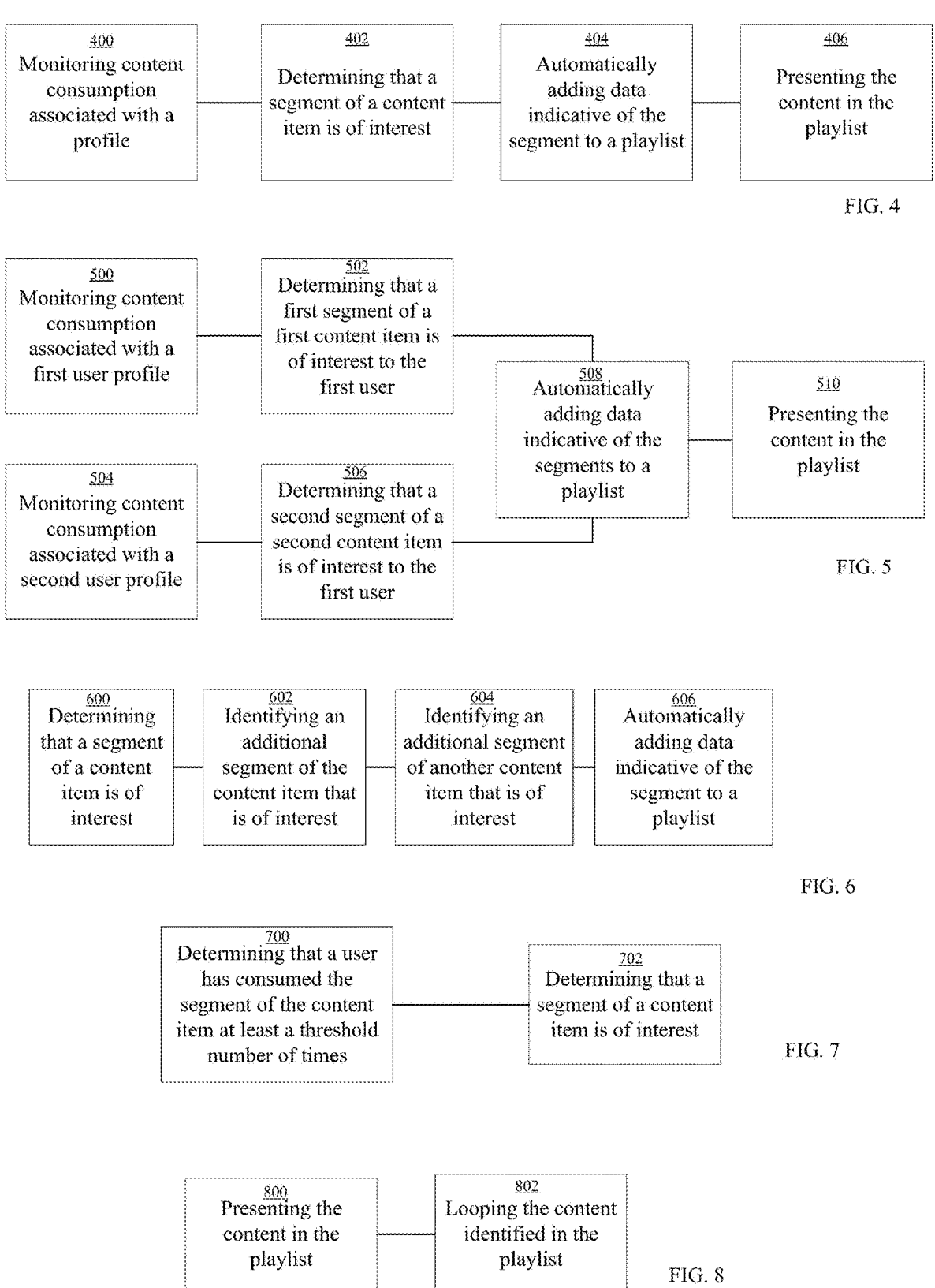
FIG. 4 is a flowchart of illustrative steps involved in identifying a content item segment of interest to the user and adding it to a playlist, in accordance with some embodiments of the disclosure.
FIG. 5 is a flowchart of illustrative steps involved in identifying content item segments of interest to two users and adding them to a playlist, in accordance with some embodiments of the disclosure.
FIG. 6 is a flowchart of illustrative steps involved in identifying that additional segments of a content item, related to the first segment, are of interest to the user.
FIG. 7 is a flowchart of illustrative steps involved in identifying that a content item segment of interest to the user by determining that the user has consumed the content item at least a threshold number of times.
FIG. 8 is a flowchart of illustrative steps for looping the playlist.

FIG. 4 is a flowchart of illustrative steps involved in determining that a content item segment of interest to the user and adding it to a playlist, in accordance with some embodiments of the disclosure. In step 400, the content consumption system monitors content consumption associated with a profile. In step 402, the content consumption system determines that a content item segment is of interest to the user. For example, these content item segments can be portions of a show or movie, such as a scene or plotline. For example, these content item segments can be portions of a song, such as an intro, verse, or chorus. In some embodiments, the content item segment can be determined to be of interest to the user because the user has replayed, shared, favorited, liked, made any other indication of interest in the content item segment, and/or any combination thereof the content item segment. In step 404, the system then auto-matically adds the content item segment or data indicative of the content item segment to a playlist. In some embodiments, the data indicative of the content item segment can be a segment number or reference to a segment number, such as a part of a manifest or playlist received by a user. The content consumption system can then present the content in the playlist.

FIG. 5 is a flowchart of illustrative steps involved in determining that content item segments are of interest to two users and adding them to a playlist, in accordance with some embodiments of the disclosure. For example, FIG. 5 can be used to implement step 402 of FIG. 4. In steps 500 and 504, the content consumption system monitors consumption with first and second user profiles respectively. In step 502, the content consumption system determines that a first content item segment of a first content item is of interest to a first user profile. In step 506, the content consumption system determines that a second content item segment of a second content item is of interest to a second user profile. These user profiles may be determined to be associated. In some embodiments, the users may be in the same family, be friends, live in the same area, be interested in the same genres, any other suitable relationship, and/or any combi-nation thereof. In some suitable approaches, the content consumption system may determine that users are associated with each other based on monitoring conversations between them over text or phone, monitoring conversations about them between other people, monitoring geographic location determined by GPS, comparing metadata about shows watched by each of the users, any other relationship moni-toring, and/or any combination thereof. At step 508, the content consumption systems adds the content item seg-ments to one playlist and, at step 510, it presents the playlist. In some embodiments, the content consumption system can determine a content item segment to be of interest to a user if the content item segment is determined to be of interest to another user associated with the user. Then, the content consumption system will add the content item segment to the playlist of the user associated with the other user.

FIG. 6 is a flowchart of illustrative steps involved in identifying that additional content item segments, related to the first content item segment, are of interest to the user. For example, FIG. 6 can be used to implement step 402 of FIG. 4. At step 600, the content consumption system determines that the content item segment is of interest. In some embodi-ments, as in step 602, the content consumption system determines that an additional content item segment of the first content item is also of interest. In some suitable approaches, the additional content item segment of the first content item can be determined to be of interest because it is related to the first content item segment of the first content item. For example, the additional content item segment may be a part of the same plot line, contain the same characters, be of the same genre, be related in any other suitable manner, and/or any combination thereof. In some embodiments, as in step 604, the content consumption system determines that a content item segment of a second content item is of interest. In some suitable approaches, the additional content item segment of the second content item can be determined to be of interest because it is related to the first content item segment of the first content item. For example, the additional content item segment may be of the same genre, contain the same actors, be at the same location, be related in any other suitable manner, and/or any combination thereof. At step 606, these content item segments or data indicative of the content item segments are added to a playlist.

FIG. 7 is a flowchart of illustrative steps involved in identifying that a content item segment is of interest to the user by determining that the user has consumed the content item segment at least a threshold number of times. For example, FIG. 7 can be used to implement step 402 of FIG. 4. In some embodiments, this threshold may be a preset number. In some embodiments, the threshold may be deter-mined based on a comparison with the number of times another content item segment has been repeated.

FIG. 8 is a flowchart of illustrative steps for presenting the content in the playlist. For example, FIG. 8 can be used to implement step 406 of FIG. 4. At step 800, the content consumption system presents content from the playlist. In some embodiments, as in step 802, the content consumption system can loop the playlist for the user. When a playlist is looped, the content items and/or content item segments identified therein are played one after another and when all of the identified content items and content item segments are played, the content consumption system repeats playing the content items and content item segments. This looping can occur indefinitely until, for example, the user cancels the operation. In some suitable approaches, playback of content items and content item segments identified in a playlist can occur in order of when the respective content items and content item segments were added to the playlist. In some suitable approaches, playback can be shuffled, in order of date of production or release of the content item, alphabeti-cally, any other suitable playback ordering, or any combination thereof. For example, the playlist may be presented alphabetically by song title, album title, or artist name, any other suitable playback ordering, or any combination thereof. For example, a playlist could consist of the content items and content item segments: "Gilmore Girls," Scene 3 (2000), "The Marvelous Mrs. Maisel" Trailer (2017), and "NCIS" Scene 2b (2003). If the playlist is presented alphabetically ignoring articles, the presentation order would be "Gilmore Girls," Scene 3, "The Marvelous Mrs. Maisel" Trailer, "NCIS" Scene 2b. If the playlist is presented in a looped fashion alphabetically, the presentation order would be "Gilmore Girls," Scene 3, "The Marvelous Mrs. Maisel" Trailer, "NCIS" Scene 2b, "Gilmore Girls," Scene 3, "The Marvelous Mrs. Maisel" Trailer, "NCIS" Scene 2b, "Gilmore Girls," Scene 3, "The Marvelous Mrs. Maisel" Trailer, "NCIS" Scene 2b, . . . until a user cancels the operation. If the playlist is presented chronologically, the presentation order would be "Gilmore Girls," Scene 3, "NCIS" Scene 2b, "The Marvelous Mrs. Maisel" Trailer. In some suitable approaches, the content consumption system can automatically present the content items and content item segments identified in the playlist in a looped fashion, with or without the user requesting the content to be looped. In some suitable approaches, the content consumption system loops the segment back to back automatically. In some suitable approaches, the content consumption system loops each segment until a user indicates they would like to view the next segment. A user can indicate they would like to view the next segment via, for example, a finger tap, swipe, any other suitable gesture, and/or any combination thereof.

Figure 9:
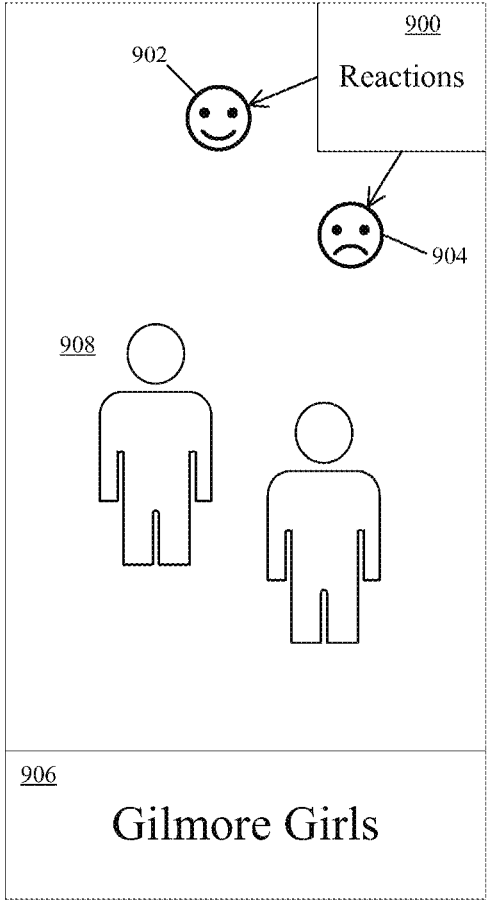
FIG. 9 shows an illustrative display screen that provides a content item and also provides selectable options for interest or lack of interest in the content item.

FIG. 9 shows an illustrative display screen that provides a content item and also provides selectable options for interest in the content item. For example, FIG. 8 can be used to implement step 402 of FIG. 4. The content item display 908 shows the content item. More information about the content item can be shown in an informational display 906. For example, the show title, episode title, show description, scrubbing bar, a scene, any other suitable information, and/or any combination thereof can be displayed. Reactions button 900 gives selectable options 902 and 904 for a user to indicate that they like or dislike, respectively, a content item or content item segment. Reactions can also include being confused, surprised, any other suitable reaction, and/or any combination thereof. Additionally, further interaction data such as likes, dislikes, shares, skips, any other suitable interaction, and/or any combination thereof is collected from the user's interactions with the recommended segments to refine the personalization profile.

Figure 10:
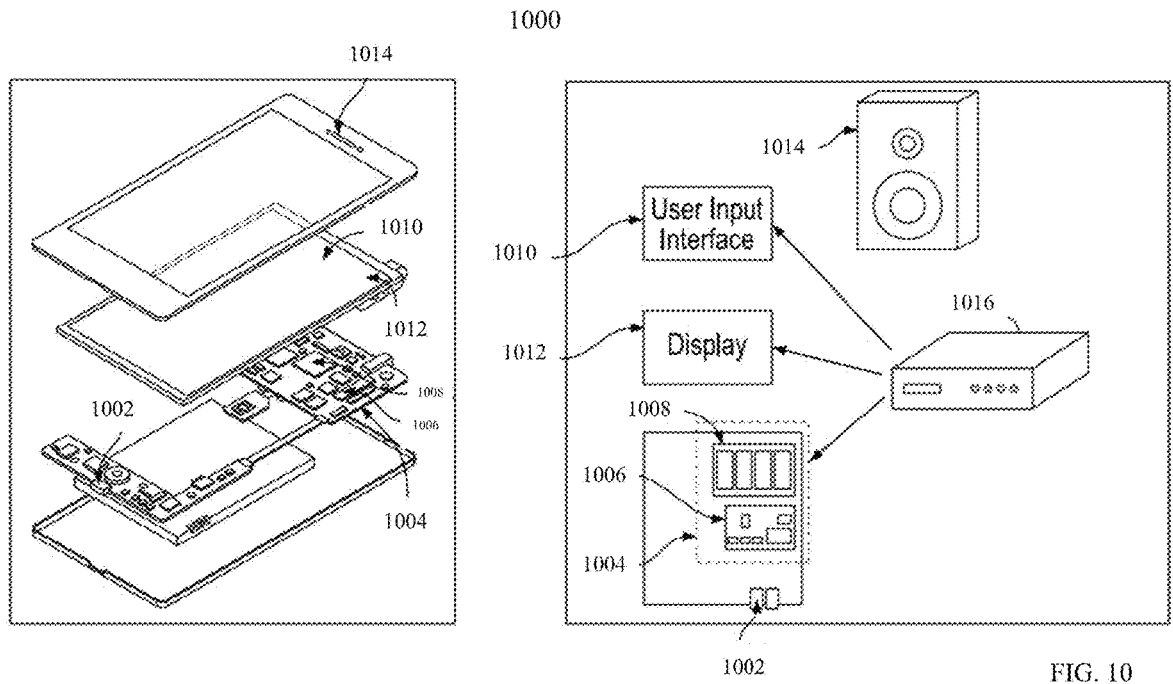
FIG. 10 is a block diagram of an illustrative media system in accordance with some embodiments of the present disclosure.

Users may access the playlist with segments of contents found to be of interest from one or more of their user equipment devices. FIG. 10 shows generalized embodiments of illustrative user equipment device 1000. In some embodiments, user equipment device 1000 may be a smartphone device, remote control, any other suitable device, and/or any combination thereof. In another example, user equipment system 1000 may be a user television equipment system. User television equipment system 1000 may include a set-top box 1016. Set-top box 1016 may be communicatively connected to speaker 1014 and display 1012. In some embodiments, display 1012 may be a television display or a computer display. In some embodiments, set top box 1016 may be communicatively connected to user interface input 1010. In some embodiments, user interface input 1010 may be a remote-control device. Set-top box 1016 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of user equipment devices are discussed below in connection with FIG. 11. Each one of user equipment device 1000 and user equipment system 1000 may receive content and data via input/output (hereinafter "I/O") path 1002. I/O path 1002 may provide content (e.g., broadcast programming, on-demand programming, Internet content, content available over a local area network (LAN) or wide area network (WAN), enhanced interactive content (including contextual information) and/or other content) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths but are shown as a single path in FIG. 10 to avoid overcomplicating the drawing.

Control circuitry 1004 may be based on any suitable processing circuitry such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1004 executes instructions for an application stored in memory (e.g., storage 1008), such the content consumption system. Specifically, control circuitry 1004 may be instructed by the content consumption system to perform the functions discussed above and below. For example, the content consumption system may provide instructions to control circuitry 1004 to generate the enhanced interactive content, including indicators and contextual information. In some implementations, any action performed by control circuitry 1004 may be based on instructions received from the content consumption system. In client-server based embodiments, control circuitry 1004 may include communications circuitry suitable for communicating with a content consumption system server or other networks or servers. The instructions for carrying out the above-mentioned functionality may be stored on the content consumption system server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 1008 that is part of control circuitry 1004. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1008 may be used to store various types of content described herein as well as enhanced interactive content data described above. Nonvolatile memory may also be used (e.g., to launch a boot-up routine and other instructions). Cloud-based storage, described in relation to FIG. 11, may be used to supplement storage 1008 or instead of storage 1008. Control circuitry 1004 may include video-generating circuitry and tuning circuitry, such as one or more analog tuners, one or more MPEG decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for up-converting and down-converting content into the preferred output format of the user equipment 1000. Circuitry 1004 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive enhanced interactive content data. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may send instructions to control circuitry 1004 using user input interface 1010. User input interface 1010 may be any suitable user interface, such as a remote control, mouse, 30 trackball, keypad, keyboard, touchscreen, touchpad, stylus input, joystick, voice recognition interface, or other user input interfaces. Display 1012 may be provided as a stand-alone device or integrated with other elements of each one of user equipment device 1000 and user equipment system 1000. For example, display 1012 may be a touchscreen or touch-sensitive display. In such circumstances, user input interface 1010 may be integrated with or combined with display 1012. Display 1012 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin film transistor display, organic light-emitting diode display, surface-conduction electron emitter display (SED), laser television, carbon nanotubes, quantum dot display, interferometric modulator display, or any other suitable equipment for displaying visual images. In some embodiments, display 1012 may be HDTV-capable. In some embodiments, display 1012 may be a 3D display, and the interactive application and any suitable content may be displayed in 3D. A video card or graphics card may generate the output to the display 1012. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 1004. The video card may be integrated with the control circuitry 1004. Speakers 1014 may be provided as integrated with other elements of each one of user equipment device 1000 and user equipment system 1000 or may be stand-alone units. The audio component of videos and other content displayed on display 1012 may be played through speakers 1014. In some embodiments, the audio may be distributed to a receiver (not shown), which processes and outputs the audio via speakers 1014.

The content consumption system may be implemented using any suitable architecture. For example, it may be a stand-alone application wholly implemented on each one of user equipment device 1000 and user equipment system 1000. In such an approach, instructions of the content consumption system are stored locally (e.g., in storage 1008), and data for use by the content consumption system is downloaded on a periodic basis (e.g., from an out-of-band feed, from an Internet resource, or using another suitable approach). Control circuitry 1004 may retrieve instructions of the content consumption system from storage 1008 and process the instructions to generate any of the displays discussed herein. Based on the processed instructions, control circuitry 1004 may determine what action to perform when input is received from input interface 1010. For example, movement of a cursor on a display up/down may be indicated by the processed instructions when input interface 1010 indicates that an up/down button was selected.

In some embodiments, the content consumption system is a client-server based application. Data for use by a thick or thin client implemented on each one of user equipment device 1000 and user equipment system 1000 is retrieved on-demand by issuing requests to a server remote to each one of user equipment device 1000 and user equipment system 1000. In one example of a client-server based content consumption system, control circuitry 1004 runs a web browser that interprets web pages provided by a remote server. For example, the remote server may store the instructions for the content consumption system in a storage device. The remote server may process the stored instructions using circuitry (e.g., control circuitry 1004) and generate the displays discussed above and below. The client device may receive the displays generated by the remote server and may display the content of the displays locally on equipment device 1000. This way, the processing of the instructions is performed remotely by the server while the resulting displays are provided locally on equipment device 1000. Equipment device 1000 may receive inputs from the user via input interface 1010 and transmit those inputs to the remote server for processing and generating the corresponding displays. For example, equipment device 1000 may transmit a communication to the remote server indicating that an up/down button was selected via input interface 1010. The remote server may process instructions in accordance with that input and generate a display of the content consumption system corresponding to the input (e.g., a display that moves a cursor up/down). The generated display is then transmitted to equipment device 1000 for presentation to the user. In some embodiments, the content consumption system is downloaded and interpreted or otherwise run by an interpreter or virtual machine (run by control circuitry 1004). In some embodiments, the content consumption system may be encoded in the ETV Binary Interchange Format (EBIF), received by control circuitry 1004 as part of a suitable feed, and interpreted by a user agent running on control circuitry 1004. For example, the content consumption system may be an EBIF application. In some embodiments, the content consumption system may be defined by a series of JAVA-based files that are received and run by a local virtual machine or other suitable middleware executed by control circuitry 1004. In some of such embodiments (e.g., those employing MPEG-2 or other digital media encoding schemes), the content consumption system may be, for example, encoded and transmitted in an MPEG-2 object carousel with the MPEG audio and video packets of a program.

Figure 11:
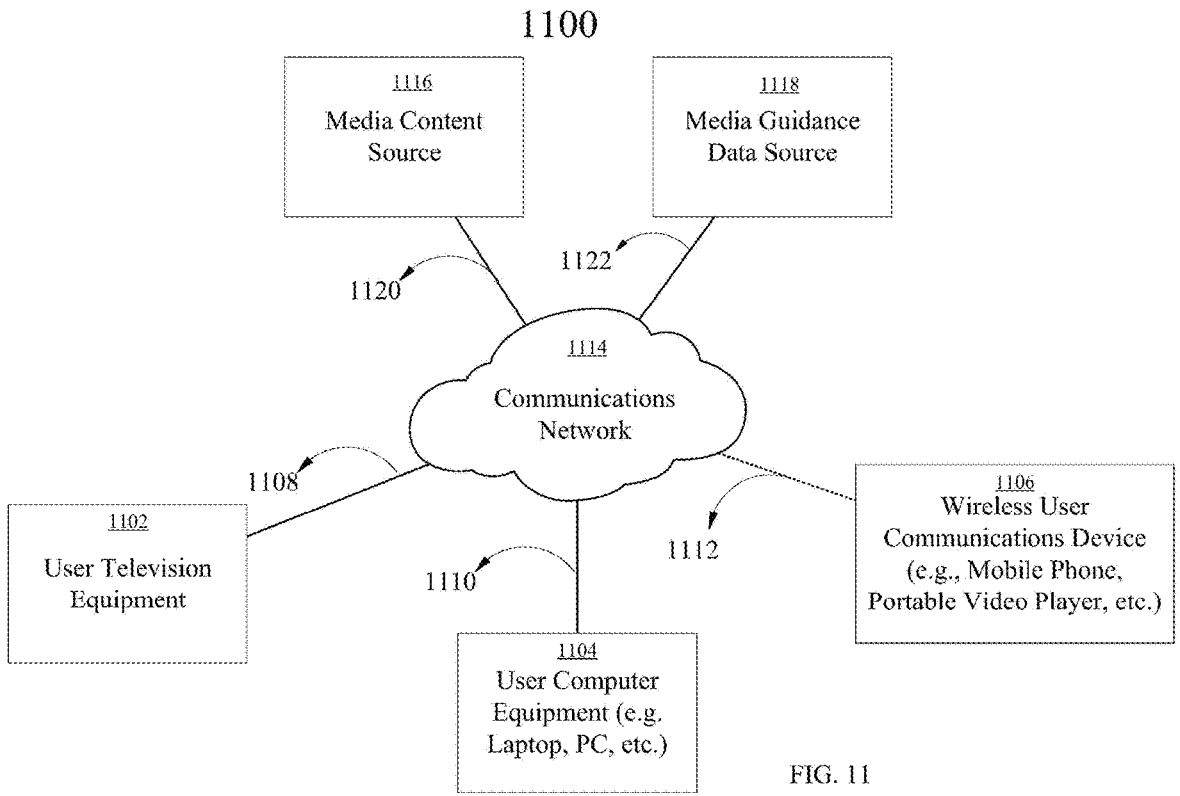
FIG. 11 is a block diagram of an illustrative user equipment device in accordance with some embodiments of the present disclosure.

Each one of user equipment device 1000 and user equipment system 1000 of FIG. 10 can be implemented in system 1100 of FIG. 11 as user television equipment 1102, user computer equipment 1104, wireless user communications device 1106, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which the content consumption system may be implemented, may function as a standalone device or may be part of a network of devices. Various network configurations of devices may be implemented and are discussed in more detail below. A user equipment device utilizing at least some of the system features described above in connection with FIG. 10 may not be classified solely as user television equipment 1102, user computer equipment 1104, or a wireless user communications device 1106. For example, user television equipment 1102 may, like some user computer equipment 1104, be Internet-enabled allowing for access to Internet content, while user computer equipment 1104 may, like some television equipment 1102, include a tuner allowing for access to television programming. The content consumption system may have the same layout on various different types of user equipment or may be tailored to the display capabilities of the user equipment. For example, on user computer equipment 1104, the content consumption system may be provided as a website accessed by a web browser. In another example, the content consumption system may be scaled down for wireless user communications devices 1106. In system 1100, there is typically more than one of each type of user equipment device but only one of each is shown in FIG. 11 to avoid overcomplicating the drawing. In addition, each user may utilize more than one type of user equipment device and also more than one of each type of user equipment device.

In some embodiments, a user equipment device (e.g., user television equipment 1102, user computer equipment 1104, wireless user communications device 1106) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 may be one or more networks including the Internet, a mobile phone network, mobile voice or data network (e.g., a 4G, 5G, or LTE network), cable network, public switched telephone network, or other types of communications network or combinations of communications networks. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well as other short range point-to-point communication paths, such as USB cables, IEEE 1394 cables, wireless paths (e.g., Bluetooth, infrared, IEEE 302-11x, etc.), or other short-range communication via wired or wireless paths. BLUETOOTH is a certification mark owned by Bluetooth SIG, INC. The user equipment devices may also communicate with each other directly through an indirect path via communications network 314.

System 1100 includes content source 1116 and enhanced media guidance data source 1118 coupled to communications network 1114 via communication paths 1120 and 1122, respectively. Paths 1120 and 1122 may include any of the communication paths described above in connection with paths 1108, 1110, and 1112. Communications with the content source 1116 and enhanced media guidance data source 1118 may be exchanged over one or more communications paths but are shown as a single path in FIG. 11 to avoid overcomplicating the drawing. In addition, there may be more than one of each of content source 1116 and enhanced media guidance data source 1118, but only one of each is shown in FIG. 11 to avoid overcomplicating the drawing. (The different types of each of these sources are discussed below.) If desired, content source 1116 and enhanced media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112. Enhanced media guidance data source 1118 may contain an enhanced metadata database.

Content source 1116 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 1116 may be the originator of content (e.g., a television broadcaster, a Webcast provider, etc.) or need not be the originator of content (e.g., an on-demand content provider, an Internet provider of content of broadcast programs for downloading, etc.). Content source 1116 may include cable sources, satellite providers, on-demand providers, Internet providers, over-the-top content providers, or other providers of content. Content source 1116 may also include a remote media server used to store different types of content (including video content selected by a user), in a location remote from any of the user equipment devices.

Enhanced media guidance data source 1118 may provide enhanced metadata, including contextual information for respective audio/video content objects provided by content source 1116. Enhanced metadata may be provided to the user equipment devices using any suitable approach. In some embodiments, the content consumption system may be a stand-alone application that receives enhanced metadata via a data feed (e.g., a continuous feed or trickle feed). Enhanced metadata and other data may be provided to the user equipment on a television channel sideband, using an in-band digital signal, using an out-of-band digital signal, or by any other suitable data transmission technique. Enhanced metadata and other data may be provided to user equipment on multiple analog or digital television channels.

In some embodiments, enhanced metadata from enhanced media guidance data source 1118 may be provided to user equipment using a client-server approach. For example, a user equipment device may pull enhanced metadata from a server, or a server may push enhanced metadata to a user equipment device. In some embodiments, a content consumption system client residing on the user's equipment may initiate sessions with source 1118 to obtain enhanced metadata when needed, such as when the local enhanced metadata is out of date or when the user equipment device receives a request from the user to receive data. Enhanced metadata may be provided to the user equipment with any suitable frequency (e.g., continuously, daily, a user-specified period of time, a system-specified period of time, in response to a request from user equipment, etc.). Enhanced media guidance data source 1118 may provide user equipment devices 1102, 1104, and 1106 the content consumption system itself or software updates for the content consumption system.

Applications may be, for example, stand-alone applications implemented on user equipment devices. For example, the content consumption system may be implemented as software or a set of executable instructions which may be stored in storage 1008 and executed by control circuitry 1004 of each one of user equipment device 1000 and user equipment system 1000. In some embodiments, applications may be client-server applications where only a client application resides on the user equipment device, and a server application resides on a remote server. For example, applications may be implemented partially as a client application on control circuitry 1004 of each one of user equipment device 1000 and user equipment system 1000 and partially on a remote server as a server application (e.g., enhanced media guidance data source 1118) running on control circuitry of the remote server. When executed by control circuitry of the remote server (such as enhanced media guidance data source 1118), the content consumption system may instruct the control circuitry to generate the content consumption system displays and transmit the generated displays to the user equipment devices. The server application may instruct the control circuitry of the enhanced media guidance data source 1118 to transmit data for storage on the user equipment. The client application may instruct control circuitry of the receiving user equipment to generate the content consumption system displays.

Content and/or enhanced metadata delivered to user equipment devices 1102, 1104, and 1106 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP need not be responsible for the viewing abilities, copyrights, or redistribution of the content, and, in one suitable approach, only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide enhanced metadata described above. In addition to content and/or enhanced metadata, providers of OTT content can distribute applications (e.g., web-based applications or cloud-based applications), or the content can be displayed by applications stored on the user equipment device.

System 1100 is intended to illustrate a number of approaches, or network configurations, by which user equipment devices and sources of content and enhanced metadata may communicate with each other for the purpose of accessing content and providing respective contextual information. The embodiments described herein may be applied in any one or a subset of these approaches, or in a system employing other approaches for delivering content and providing contextual information.

For example, in one suitable approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 1114. These cloud resources may include one or more content sources 1116 and one or more enhanced metadata sources 1118. In addition, or in the alternative, the remote computing sites may include other user equipment devices, such as user television equipment 1102, user computer equipment 1104, and wireless user communications device 1106. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 1104 or wireless user communications device 1106 having a content capture feature. Alternatively, the user can first transfer the content to a user equipment device, such as user computer equipment 1104. The user equipment device storing the content uploads the content to the cloud using a data transmission service on communications network 1114. In some embodiments, the user equipment device itself is a cloud resource, and other user equipment devices can access the content directly from the user equipment device on which the user stored the content.

Cloud resources may be accessed by a user equipment device using, for example, a web browser, an application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 10.

Figure 12:
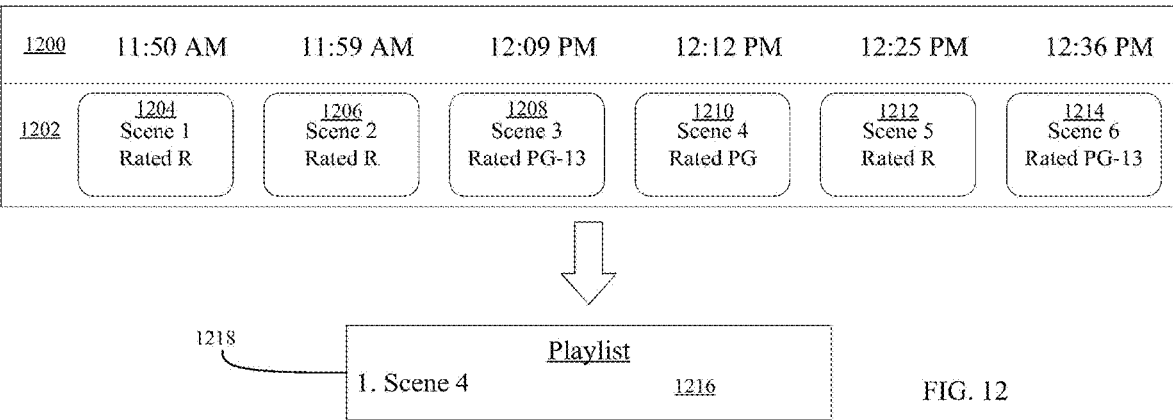
FIG. 12 shows an illustrative example for generating a playlist from a content item having segments with maturity ratings, in accordance with some embodiments of the disclosure.

FIG. 12 shows illustrative example for generating a playlist from a content item with content item segments with maturity ratings, in accordance with some embodiments of the disclosure. A user profile can have certain types of media blocked from viewing. For example, a user profile may have customized maturity ratings, viewing restrictions (e.g., some titles are blocked), language preferences, any suitable restrictions, and/or any combination thereof. In some embodiments, a user may wish to view a segment of a content item which is below the user's maturity settings, but the content item contains content item segments above the user's maturity settings. FIG. 12 shows a content item broken into scenes 1202 viewed at times 1200. Scenes 1204, 1206, and 1212 are rated R. Scenes 1208 and 1214 are rated PG-13, while scene 1210 is rated PG. A user's profile with a maturity restriction at PG may indicate they are interested in the content item. They are blocked from viewing the entire content item (e.g., the segment/scene in the playlist is not deeplinked to the full content item and/or attempting to play the full content item results in a message to inform the user that the item is not accessible due to parental control settings and/or preset maturity ratings), but a playlist 1218 is generated with the allowed scene 1216. The content consumption system can offer playlist 1218 to the user so that they may watch the allowed portion of the content item. In general, the user can transition to the full content item form the media content segment. All media content segments are deep-linked to the full content item (e.g., movie, or episode where the content item segment or segments belong to, etc.).

In some embodiments, the content consumption system determines that a content item segment is present in a content item that is rated above the current user profile's maturity ratings or the content item segment itself is rated above the current user profile's maturity ratings, and does not add the content item segment to the playlist. In some suitable approaches, information associated with the content item segment can be stored and remain accessible to the recommendation engine even though it was not added to the playlist. The information indicative of the blocked content item segment can be used if, for example, the maturity ratings of the profile changes, or for a recommendation for other user profiles when appropriate.

In some embodiments, the content consumption system can detect that a content item segment(s)/scene(s) was skipped or blocked in a broadcast that modified the content item before airing in order to make it suitable for viewing by most ages (e.g., removed objectionable content to make it suitable for ages 13 and above, i.e., PG-13, and alert the user of such action and present a list of services that hosts or offers the full version of the movie (including the skipped scene or scenes). For example, if the metadata of the broadcast indicates that the broadcast version is a modified version of the original content item, then the content consumption system can determine that the broadcast version is not the original version and present an alert to the user upon such determination which can occur when the user starts watching the channel/broadcast. Such determination can occur during the broadcast as well. In some embodiments, the deleted or blocked content segments/scenes can be added to the user's playlist if the maturity ratings for such content segments/scenes meets the maturity ratings associated with the user profile or if there's not maturity ratings associated with user profile at all. Such scenes may be available from other sources and can be referenced within the playlist or the video can be automatically pulled into the playlist. In some suitable approaches, an API may be used to pull the segments into the playlist from outside sources. For example, available APIs such as the YouTube Data API can retrieve YouTube content that match certain criteria. In some embodiments, the content consumption system may determine services that are free to the user or that the user is subscribed to that are currently offering the full version of the content item with the appropriate links or deep links to resume the content item from the time the content item segment that was skipped. For example, the deep-links allow the automatic launch and playing of the content item to include the skipped or deleted scene that was omitted from the broadcast. In cases where a content item is available from multiple sources that the user is subscribed to, a source that offers the content in ads-free form is listed first on the list and/or marked as such to indicate to the user that the content items is free from such source and does not contain any advertisements.

What is claimed is:

1. A method comprising:

monitoring content consumption associated with a profile;

determining, based on the monitoring, that a segment of an audio/video item has been consumed more than a particular number of times within a particular time period, wherein the more than the particular number of times is greater than a number of times that the audio/video item was consumed as a whole within the particular time period;

based on the determining that the segment of the audio/video item has been consumed more than the particular number of times within the particular time period, determining that an audio portion of the segment of the audio/video item corresponds to a stand-alone audio item; and adding an identifier of the stand-alone audio item that corresponds to the audio portion of the segment of the audio/video item to a playlist that is generated for display at a user device associated with the profile.

2. The method of claim 1, further comprising:

causing the stand-alone audio item in the playlist to be looped.

3. The method of claim 1, wherein the identifier of the stand-alone audio item is previously included in the playlist; and wherein the method further comprises:

increasing a priority for playback associated with the identifier of the stand-alone audio item in the playlist.

4. The method of claim 1, wherein the identifier of the stand-alone audio item is previously included in the playlist; and wherein the method further comprises:

increasing a priority for recommending one or more identifiers of other audio items related to the identifier of the stand-alone audio item.

5. The method of claim 1, wherein the audio portion of the segment is not included in other segments of the audio/video item.

6. The method of claim 1, wherein the determining that the audio portion of the segment of the audio/video item corresponds to the stand-alone audio item is further based on:

detecting a user action associated with the segment of the audio/video item, wherein the user action comprises at least one of: favoriting, liking, or sharing the segment of the audio/video item.

7. The method of claim 1, wherein the determining that the audio portion of the segment of the audio/video item corresponds to the stand-alone audio item is further based on:

determining a first level of engagement with the audio portion of the segment of the audio/video item;

determining a second level of engagement with a video portion of the segment of the audio/video item; and determining that the first level of engagement is greater than the second level of engagement.

8. The method of claim 1, wherein the determining that the audio portion of the segment of the audio/video item corresponds to the stand-alone audio item is further based on:

determining a first level of engagement with the segment of the audio/video item;

determining a second level of engagement with other segments of the audio/video item, wherein the other segments are different from the segment; and determining that the first level of engagement is greater than the second level of engagement.

9. The method of claim 1, further comprising:

identifying a relationship between the audio/video item and the audio portion of the segment of the audio/video item; and adding, to the playlist, an identifier of one or more audio/video items related to the audio/video item, wherein a relationship between each of the one or more audio/video items and a corresponding respective segment is related to the identified relationship.

10. The method of claim 1, further comprising:

adding the identifier of the stand-alone audio item that corresponds to the audio portion of the segment of the audio/video item to a second playlist that is generated for display at a second user device associated with a second profile, wherein the second profile is associated with the profile.

11. A system comprising:

control circuitry configured to:

monitor content consumption associated with a profile;

determine, based on the monitoring, that a segment of an audio/video item has been consumed more than a particular number of times within a particular time period, wherein the more than the particular number of times is greater than a number of times that the audio/video item was consumed as a whole within the particular time period;

based on the determining that the segment of the audio/video item has been consumed more than the particular number of times within the particular time period, determine that an audio portion of the segment of the audio/video item corresponds to a stand-alone audio item; and add an identifier of the stand-alone audio item that corresponds to the audio portion of the segment of the audio/video item to a playlist; and input/output circuitry configured to:

generate for display at a user device associated with the profile, the playlist.

12. The system of claim 11, wherein the control circuitry is further configured to:

cause the stand-alone audio item in the playlist to be looped.

13. The system of claim 11, wherein the identifier of the stand-alone audio item is previously included in the playlist; and wherein the control circuitry is further configured to:

increase a priority for playback associated with the identifier of the stand-alone audio item in the playlist.

14. The system of claim 11, wherein the identifier of the stand-alone audio item is previously included in the playlist; and wherein the control circuitry is further configured to:

increase a priority for recommending one or more identifiers of other audio items related to the identifier of the stand-alone audio item.

15. The system of claim 11, wherein the audio portion of the segment is not included in other segments of the audio/video item.

16. The system of claim 11, wherein the determining that the audio portion of the segment of the audio/video item corresponds to the stand-alone audio item is further based on:

detecting a user action associated with the segment of the audio/video item, wherein the user action comprises at least one of: favoriting, liking, or sharing the segment of the audio/video item.

17. The system of claim 11, wherein the determining that the audio portion of the segment of the audio/video item corresponds to the stand-alone audio item is further based on:

determining a first level of engagement with the audio portion of the segment of the audio/video item;

determining a second level of engagement with a video portion of the segment of the audio/video item; and determining that the first level of engagement is greater than the second level of engagement.

18. The system of claim 11, wherein the determining that the audio portion of the segment of the audio/video item corresponds to the stand-alone audio item is further based on:

determining a first level of engagement with the segment of the audio/video item;

determining a second level of engagement with other segments of the audio/video item, wherein the other segments are different from the segment; and determining that the first level of engagement is greater than the second level of engagement.

19. The system of claim 11, wherein the control circuitry is further configured to:

identify a relationship between the audio/video item and the audio portion of the segment of the audio/video item; and add, to the playlist, an identifier of one or more audio/video items related to the audio/video item, wherein a relationship between each of the one or more audio/video items and a corresponding respective segment is related to the identified relationship.

20. The system of claim 11, wherein the control circuitry is further configured to:

add the identifier of the stand-alone audio item that corresponds to the audio portion of the segment of the audio/video item to a second playlist that is generated for display at a second user device associated with a second profile, wherein the second profile is associated with the profile.

* * * * *